Patented Oct. 28, 1924.

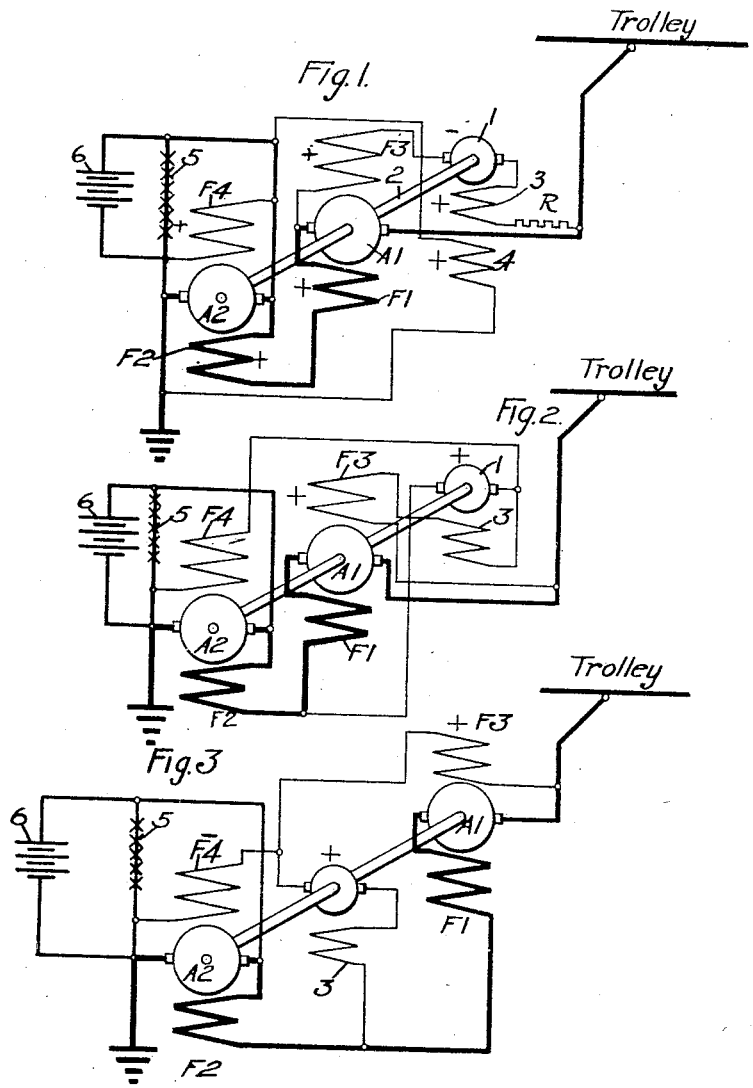

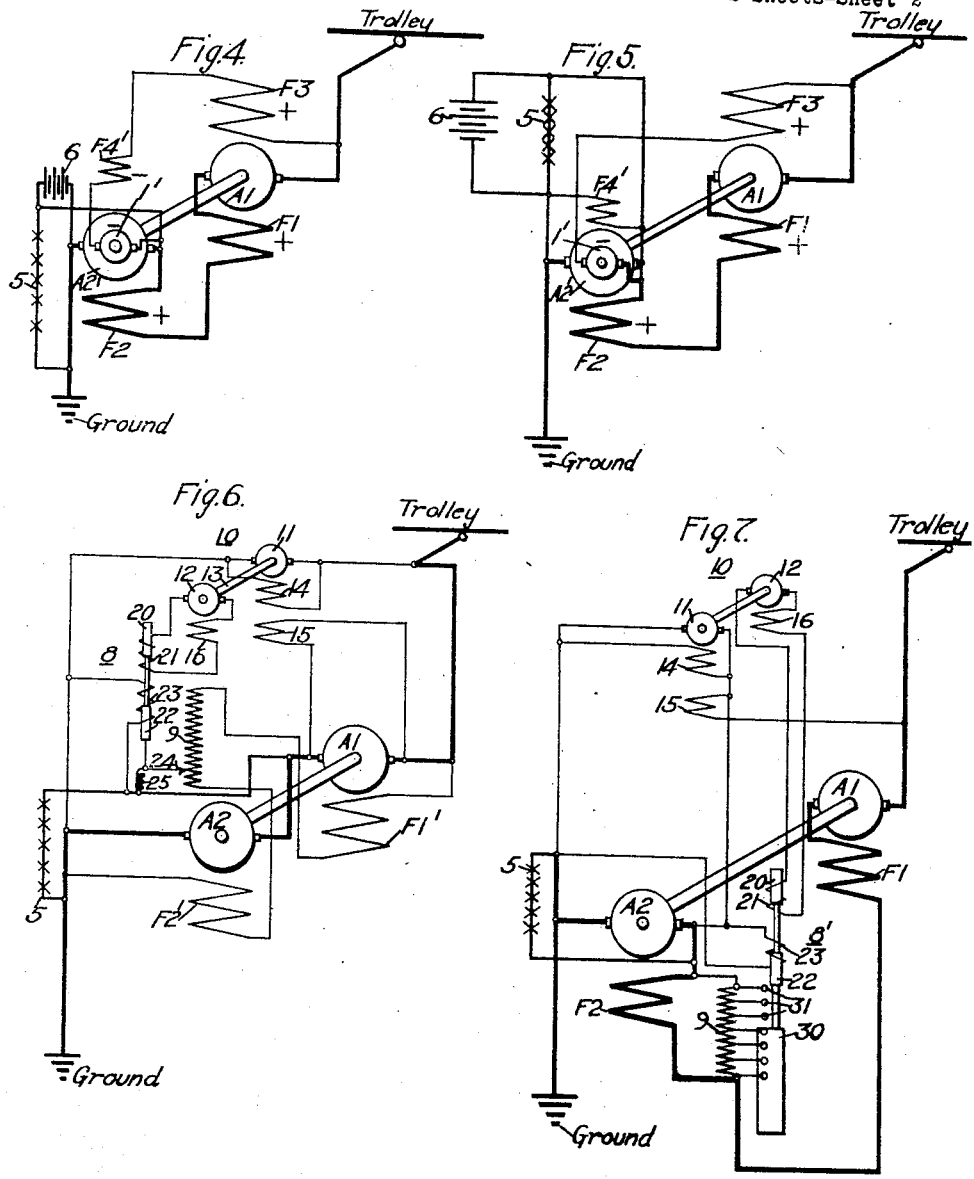

1,513,242

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed June 18, 1919. Serial No. 305,105.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Electrical Systems, of which the following is a specification.

My invention relates to electrical systems and particularly to constant-voltage systems for train-lighting purposes and the like.

One object of my invention is to provide a relatively simple and reliable system of the above-indicated character which eliminates the auxiliary brushes and the special pole construction that have been employed in some train-lighting systems of the prior art.

Viewed from a different angle, the object of my invention is to provide, in conjunction with a motor-generator set, or the equivalent, an auxiliary armature winding that is connected to influence the field windings of the motor-generator set differently, upon a variation of supply-circuit voltage, to change the voltage ratio of the motor and generator armatures; or, in other words, to maintain a substantially constant generator voltage.

Other specific objects of my present invention will become evident from the following detailed description, taken in conjunction with the accompanying drawings, wherein Fig. 1 is a diagrammatic view of the essential circuits of an electrical system embodying the invention; and Fig. 2 to Fig. 7, inclusive, are similar diagrammatic views of various modifications of the invention.

Referring to Fig. 1, the system shown comprises suitable supply-circuit conductors Trolley and Ground for supplying energy to a motor-generator set having a driving armature winding A1, a generating armature winding A2 and an auxiliary armature winding 1, all mounted upon the same operating shaft 2. The armature windings A1 and A2 are provided with series-related field windings F1 and F2, respectively, and with shunt-related field windings F3 and F4, respectively. The auxiliary armature winding 1 is provided with a series-related field winding 3 and with a field winding 4 that is excited from the generating armature A2.

One or more banks of incandescent lamps 5 are connected across the terminals of the generating armature A2 and, in addition, a storage battery 6 floats across the generating-armature distribution circuit, in accordance with familiar principles.

As indicated by the plus signs, the field windings F1 and F3 for the motor armature winding A1 are cumulative, or assist each other, and the same statement holds true with respect to the field windings F2 and F4 for the generating-armature winding A2. The auxiliary armature winding 1 is connected in opposing series relation with the field winding F3, as indicated by the minus sign; or, in other words, serves to decrease the voltage that is impressed upon the field winding F3 from the supply circuit. A resistor R is also connected in circuit with the field winding F3, for purposes to be described.

Assuming that the line voltage suddenly decreases, the voltage across the motor armature-winding A1 also decreases, while the voltage across the generating armature A2 remains practically constant because of the parallel-connected battery 6. Even without such battery, the tendency of the latter voltage will be to remain constant, primarily because the speed of the motor-generator set is prevented from changing instantaneously by the inertia of the rotating parts and, further, because the damping effect and the high self-induction of the shunt field F4 prevents the exciting field flux from dropping off quickly.

The reason why the voltage of the armature can rapidly compensate for the changed line voltage is partly because of the use of the resistance R, which imparts a smaller time elements to the circuit of the field winding F3, thus permitting the current to quickly follow all voltage changes. Furthermore, the auxiliary armature 1 assists in the proper readjustment. This action may be demonstrated best by an example. Assume, for instance, that the armature A2 is to furnish a constant voltage of 200 volts, while the line voltage suddenly drops from 600 to 400 volts. The armature A1 thus has to change its voltage from 400 to 200 volts. If the auxiliary armature 1 has an electro-motive force of 66.7 volts, while the line voltage is 600 volts, (400—66.7)=333.3 volts are impressed upon the field winding F3 and the resistor R. When the line voltage drops to 400 volts, the voltage of the auxiliary armature 1 remains 66.7 volts, neglecting, for the present, the effect of the field winding 3, because the field winding 4 is excited by a constant voltage. Thus, only a voltage of 133.3 volts remains for the field F3 and the resistor R. In other words, the field excitation for the motor armature A1 has dropped from 333.3 to 133.3, while the armature voltage has changed from 400 to 200. The greater relative voltage drop in the field winding serves to maintain constant speed in spite of the lower armature voltage. Consequently, the voltage of the generating armature A2 will remain constant, as desirable.

While the resistor R tends to impart a small time element to the circuit of the field winding F3, there is, nevertheless, sufficient self-induction in the field winding to cause a certain lag of the current changes behind the voltage variations. Such lag may further be reduced by the action of the field winding 3, as shown by the following examples.

Again assume conditions as before, except that with 600 volts line voltage the auxiliary armature furnishes 100 volts. The field windings 3 and 4 are so proportioned that the winding 4 induces a field flux corresponding to 50 volts in the armature 1, while the winding 3 also induces a voltage of 50 volts in that armature, resulting, as assumed, in a total of 100 volts. If the line voltage again drops to 400 volts, both field fluxes will at first remain unchanged, the self-induction preventing the current in the field winding 3 from changing immediately. Thus (200—100)=100 volts are impressed upon the field winding F3 and the resistor R. Subsequently, the current in the windings F3 and 3 diminishes on account of the appreciably lowered voltage. Assuming that such current drops to ⅓ of its original value, $$\frac{(50)}{(3)} = 16.7$$

volts are induced by the field winding 3, giving a total of 66.7 volts in the auxiliary armature 1, thus leaving (200—66.7)=133.3 volts for the field winding F3 and the resistor R. Therefore, for stabilized conditions, a field-voltage drop from 300 to 133.3 volts occurs, which is larger than the drop in armature voltage, as is desirable. As previously shown, however, the voltage for the field winding F3 and the resistor R decreases, for a short transient period, to a value as low as 100 volts, which decrease materially assists in reducing the field current quickly.

It will be seen, therefore, that I provide, not only an arrangement that is suitably operative to maintain stabilized conditions, but also means for quickly effecting the desired changes in machine conditions.

The action of the field windings F1 and F2 may be arranged by proper choice of saturation, etc., to give the desired compound effect with changing load current; these field windings, furthermore, assist in reducing the flashing tendency of the machines.

The converse effect, including a relatively rapid increase of the strength of the field winding F3, occurs in the event of a sudden increase of trolley voltage, as will be understood without further exposition, whereby again the speed and delivered voltage of the motor-generator set may be maintained substantially constant.

Referring to Fig. 2, the armatures A1 and A2 and the associated field windings F1 and F2 are connected as already described, while the field winding F3 is connected in series relation with the field winding 3 for the auxiliary armature-winding 1 and with the field winding F4 for the generating armature A2 across the supply circuit.

The auxiliary armature-winding 1 is connected from a point intermediate the field windings F1 and F2 to a point intermediate the field windings 3 and F4. The auxiliary armature winding 1 is thus connected across each of the other machines and is arranged to add to the voltage of the field winding F3 and to subtract from the voltage of the field winding F4, as indicated by the corresponding plus and minus signs.

Assuming that the line voltage suddenly decreases, for example, the current in the field windings 3 and F3 likewise diminishes, whereby the voltage of the auxiliary armature winding 1 is reduced to effect an increase in the current traversing the field winding F4. Thus, the current in the field winding F3 for the motor armature winding decreases, while the flux for the generating armature winding A2 is increased, by reason of the above-described connection of the auxiliary armature winding 1. Consequently, it is evident that the system may be readily designed to maintain a substantially constant voltage in the generating armature A2, whereas the motor armature A1 compensates for, or absorbs all variations in, supply-circuit voltage.

Referring to Fig. 3, the system differs from that shown in Fig. 2 only by connecting the field winding 3 in series relation with the auxiliary armature winding 1, in lieu of being connected in series relation with the field winding F3. Again, the arrangement of parts is such that the voltage of the auxiliary armature winding 1 adds to the voltage impressed upon the field winding F3 from the supply circuit and subtracts from the voltage impressed upon the field winding F4. Furthermore, it is assumed that the motor is less magnetically saturated than the generator and that, under normal voltage conditions, the field winding F3 carries slightly more current than the field winding F4, the auxiliary armature winding 1 and its field winding 3 being traversed by the difference in such currents.

In the event of a sudden decrease of line voltage, therefore, the flux of the field winding F3 decreases more rapidly than that of the field winding F4, which results in a more rapid decrease of current and voltage in the auxiliary machine than in the voltage of the motor armature winding A1. Consequently, the auxiliary machine inherently effects different variations in the effects of the field windings F3 and F4 for the motor and the generator, respectively, to produce the desired substantially constant voltage in the generating armature A2, as previously described.

In Fig. 4, an auxiliary armature winding upon the generating machine is substituted for the previously illustrated separate auxiliary machine. The generating armature A2' is thus employed for supplying energy directly to the load of incandescent lamps 5, while the auxiliary armature winding 1', which is wound upon the same core as the armature A2', is connected in series relation with a field winding F4' for the combined generating machine and the field winding F3 for the motor armature winding A1. The voltage of the auxiliary armature winding 1' is adapted to oppose that of the motor-armature winding A1, so that the voltage impressed upon the field windings F3 and F4' equals the difference between the voltages of those two armature windings. Under normal voltage conditions, the electromotive force of the auxiliary armature winding 1' is slightly lower than that of the motor armature winding A1, which requires that the field winding F4' should be differential, with respect to the field winding F2 for the generator, as indicated by the corresponding plus and minus signs, whereas the field winding F3 should act cumulatively with respect to the associated field winding F1, as also indicated by the accompanying plus signs.

Upon a sudden decrease of line voltage, the voltage of the motor-armature winding A1 diminishes at a more rapid rate than those of the armature windings 1' and A2', for previously specified reasons, whereby the resultant voltage impressed across the field windings F3 and F4' decreases at a relatively rapid rate and may even reverse. Such action tends to materially increase the field flux of the generating machine and to decrease the field flux of the driving machine, as is desirable for the purpose of increasing the speed of the motor-generator set and maintaining a substantially constant delivered voltage thereof.

In Fig. 5, the differential voltage effect of the armature windings A1 and 1' is adapted to influence only the field winding F3, the field winding F4', in the present case, being connected directly across the terminals of the generating armature winding A2'. The operation of the system of Fig. 5 will be evident from its analogy to that of the system shown in Fig. 4, and it will be appreciated that, if desired, the differential voltage effect in question may be arranged to influence the field winding F4 only.

The two systems now to be described dispense with the battery 6. Referring to Fig. 6, the motor armature winding A1 and the generator armature winding A2 are provided with shunt-related field windings F1' and F2', which are directly connected by a variable resistor 9. The relative effects of the resistor upon the field windings F1' and F2' is varied by means of a relay device 8, which is differentially energized in accordance with the voltage of the generating armature A2 and of the delivered voltage of an auxiliary motor-generator set 10.

The auxiliary motor-generator set 10 comprises a driving armature winding 11 that is connected across the supply circuit and a generating armature winding 12 which is mechanically connected to the driving armature 11 through the agency of a shaft 13, for example. A plurality of field windings 14 and 15 are provided for the driving armature winding 11, being respectively connected across that armature winding and across the terminals of the motor armature winding A1. In case the auxiliary motor of the motor-generator set 10 may be maintained magnetically unsaturated throughout its working range, then the shunt field winding 14 alone will be sufficient to render the motor-generator-set speed independent of the line voltage. However, if a small degree of saturation can not be avoided, then the second field winding 15, connected as shown, may be utilized.

A series field winding 16 for the generating armature winding 12 is connected through an actuating coil 21 for the relay device 8, across the terminals of the armature winding 12.

The relay device 8 comprises, essentially, a plurality of alined magnetizable core members 20 and 22, which are respectively provided with actuating coils 21 and 23 acting differentially and respectively energized in accordance with the voltage of the auxiliary generating armature 12 and of the main generating armature A2. The switch arm 24 makes contact with various taps of the resistor 9 in accordance with the movement of the relay device 8, the switch arm 24 being connected through a suitable flexible conductor 25 between the resistor 9 and a point intermediate the armature windings A1 and A2.

Upon a sudden decrease of line voltage, the voltage of the main motor armature winding A1 diminishes more rapidly than the supply-circuit voltage, as previously pointed out, whereby the resultant field flux emitted by the field windings 14 and 15 likewise decreases more rapidly than the line voltage, thus maintaining the speed of the auxiliary motor-generator set 10 substantially constant. Consequently, the voltage impressed upon the actuating coil 21 for the relay device 8 is likewise maintained substantially constant. The relay device 8 is thus actuated in accordance with the variations of the generated voltage of the armature winding A2 with respect to the constant voltage of the auxiliary generator armature 12. In this way, the movement of the relay switch arm 24 along the taps of the resistor 9 may be utilized to so vary the excitation of the field windings F1 and F2 that a substantially constant delivered voltage of the main motor-generator set may be maintained during supply-circuit-voltage fluctuations.

In Fig. 7, the driving armature winding 11 for the auxiliary motor-generator set 10 is connected across the substantially constant-voltage armature winding A2, whereby such slight variations in speed as may occur in the auxiliary motor-generator set 10, when connected as shown in Fig. 6, are substantially eliminated.

The field windings F1 and F2 are connected in series relation with the armature windings A1 and A2, and the variable resistor 9 is connected in parallel relation to the field winding F2. In the present case, a relay 8' has its actuating coils 21 and 23 connected as already described in connection with Fig. 6; the relay being provided with a movable contact plate 30, which is adapted to engage various numbers of control fingers 31 that are connected to the resistor 9, as the relay device travels up and down in accordance with the relation of the voltage of the armature winding A2 to that of the armature winding 12. In this case also, therefore, the slight variations in the voltage of the main generator armature A2 are utilized to so vary the active circuit value of the resistor 9 as to compensate for the supply-circuit-voltage fluctuations by properly varying the voltage impressed upon the field winding F2 for the armature winding A2.

It should be understood that all of the illustrated field windings for the various armature windings are not necessary in every case, and, in particular, the field windings F1 and F2 may, if desired, be omitted in those cases where the associated field windings F3 and F4 are provided. It is further possible to add to the various systems means for speeding up the desired changes in the machine conditions, such as the resistor R and the field winding 3 shown in Fig. 1. Other variations in the particular field-winding connections to be employed may also be made without departing from the spirit and scope of my invention. I desire, therefore, that only such limitations shall be imposed as are indicated in the appended claims.

I claim as my invention:

1. The combination with a supply circuit, a motor armature winding and a generator armature winding driven thereby, of an auxiliary armature winding connected to influence the excitation of the motor and the generator armature differently upon a variation of supply-circuit voltage.

2. The combination with a motor armature winding and a generator armature winding driven thereby, of a plurality of field windings for exciting said armature windings, and an auxiliary armature winding rotatable with said motor armature and connected to influence said field windings differently under predetermined operating conditions and change the normal voltage ratio of said motor to said generator armature winding.

3. The combination with a supply circuit, a motor armature winding and a generator armature winding driven thereby, of a plurality of field windings for exciting said armature windings, and an auxiliary armature winding connected to influence said field windings differently upon a variation in supply-circuit voltage and change the normal voltage ratio of said motor to said generator armature winding.

4. The combination with a motor armature winding and a generator armature winding driven thereby, of a plurality of field windings inherently adapted to effect an unequal reduction of exciting flux for said armature windings under predetermined operating conditions, and means for accentuating such unequal reduction.

5. The combination with a supply circuit, a motor armature winding and a generator armature winding driven thereby, of a plurality of field windings inherently adapted to effect an unequal reduction of exciting flux for said armature windings upon a variation of supply-circuit voltage, and dynamo-electric means for accentuating such unequal reduction.

6. The combination with a supply circuit, a motor armature winding and a generator armature winding driven thereby, of a plurality of field windings inherently adapted to effect an unequal reduction of exciting flux for said armature windings upon a variation of supply-circuit voltage, and an auxiliary armature winding connected in circuit with said field windings for thereupon producing an impulse acting to exaggerate such unequal reduction.

In testimony whereof, I have hereunto subscribed my name this 6th day of June, 1919.

RUDOLF E. HELLMUND.